Dec. 7, 1965  C. J. SWARTWOUT ETAL  3,221,561
INSTRUMENT DEVIATION INDICATOR
Filed Oct. 14, 1963
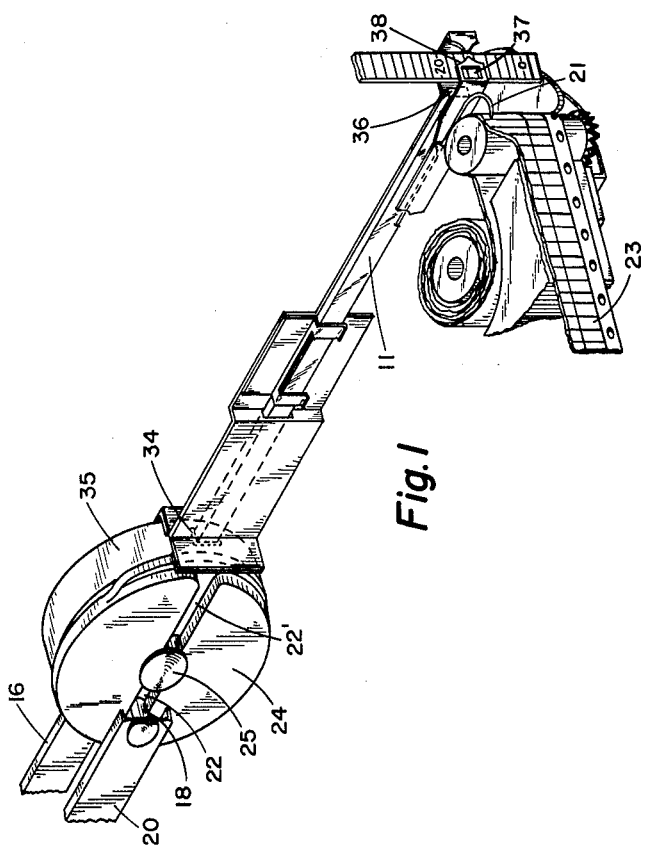
Fig.1
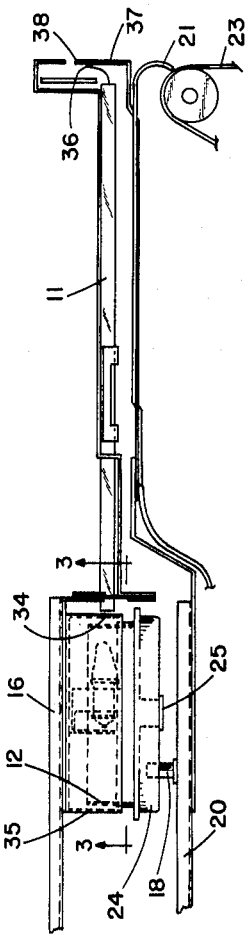
Fig.2
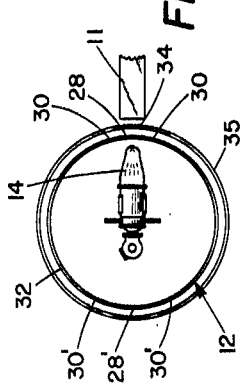
Fig.3
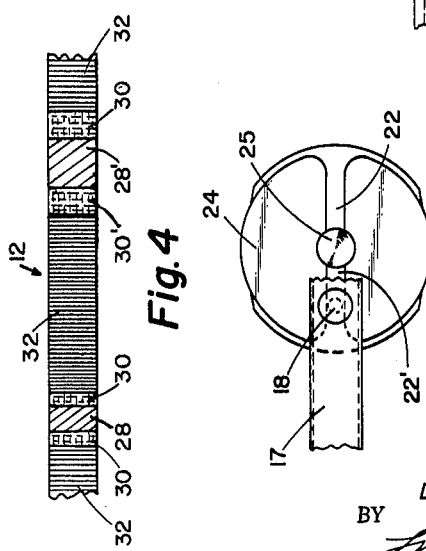
Fig.4
Fig.5
INVENTORS
Charles J. Swartwout
Denton Kenyon Swartwout
BY
ATTY'S.

3,221,561
INSTRUMENT DEVIATION INDICATOR
Charles J. Swartwout, Scottsdale, and Denton Kenyon Swartwout, Phoenix, Ariz., assignors to Motorola, Inc., Chicago, Ill., a corporation of Illinois
Filed Oct. 14, 1963, Ser. No. 316,036
5 Claims. (Cl. 73—432)

The invention relates in general to process instrumentation and in particular to an instrument indicator which indicates by a change in color, both large and moderate deviations from a given operating point.

Monitoring a large number of instruments is considerably simplified when the instruments provide a deviation warning in case of equipment failure or for some other reason which might change the temperature, pressure, flow or other controlled parameter of a process.

The present invention provides a color change display that indicates not only a deviation of a measured parameter of a process from an operating point or set point at which the process is to be maintained, but the degree of deviation as well. Unlike most zero center instruments and others which must be observed from an in-line location to properly note the deviation from an operating point, this display causes a direct indication that is attention getting and immediately understood without the operator having to read numbers.

In the accompanying drawings:

FIG. 1 is a perspective view of a device for a controller instrument in accordance with this invention which provides a color modulated signal to indicate deviation when present and degree of deviation of a process variable from some desired set point;

FIG. 2 is a top view of the complete device;

FIG. 3 is a cutaway view of the circular case portion of the device which houses a source of illumination and a color filter;

FIG. 4 shows a layout of a color filter used in an embodiment of the invention; and FIG. 5 is a view of a cam wheel element of the device and a portion of the signal arm of the controller which acts cooperatively with the cam wheel element.

In one embodiment of the invention, a process control instrument, having a signal indicating arm complete with a signal indicator and a recording pen which moves in response to signals from a process monitoring transducer, and a set point arm with indicator which is used for setting the instrument at the point at which a process is to be maintained, is equipped so that relative displacement of the two arms will cause a color change apparent at the face of the instrument from green to yellow to red depending on the amount of deviation of the process from the set point. For example, if pressure were to be held in a container at 500 p.s.i., the set point arm would be set at 500 p.s.i. on the instrument and as long as the pressure were maintained at very nearly 500 p.s.i. both arms would not be displaced from one another to any appreciable extent and the display portion of the indicator of the instrument would be green. A malfunction in the system allowing the pressure to vary slightly from the desired 500 p.s.i. control point would move the indicating arm and cause a slight relative displacement of the two arms and the display would glow with yellow light, a larger deviation from the 500 p.s.i. control point would further move the indicating arm to cause a larger relative displacement of the two arms and the display would then glow red. This color modulation is accomplished with the aid of a device called a deviation indicator.

In this particular embodiment, the deviation indicator device shown in FIGS. 1 and 2 has a polished transparent plastic rod 11 optically coupled to a color wheel 12 (FIG. 3) and an incandescent lamp light source 14. This device is mounted on the movable set point arm 16 of a set point unit (not shown) which through the arm moves the pen 21 over the chart paper 23. Pin 18 engages a slot 22 in the molded plastic cam wheel 24. Relative motion between the arms 16 and 20 causes rotation of the cam wheel 24 about its pivot 25 thereby rotating the color wheel 12 attached to the cam wheel. The color wheel 12 is formed with a strip of multicolored transparent plastic having sets of filters or bands of different colors as shown in FIG. 4. In one set of filters of this embodiment there is a narrow band of green 28 on each side of which are narrow yellow bands 30. Adjacent the yellow bands are wide red bands 32.

When the pen arm and the set point are aligned, the green band 28 is between the light source 14 and the opening 34 in the opaque case 35 which allows light to shine onto the plastic rod 11. The plastic rod transmits the light by internal reflection out to the front of the instrument where it may be observed as a bright glow at the faceted end 36 of the plastic rod 11; a window 37 in the signal indicator 38 is provided so that it will not block off the light. Relative displacement of the two arms 16 and 20 causes the color wheel to rotate and move the bands 28, 30 and 32 relative to the case opening 34 thereby modulating the color from green to yellow to red, thus giving a gradual measure of deviation between the signal and the set point as the signal indicating arm changes its position. Of course, the pattern of grading on the color wheel is unrestricted and can be designed to provide stepped or continuous variation of color and/or intensity.

The cam wheel 24 in the embodiment is provided with an additional slot 22'. This permits the cam wheel with the attached color wheel to be rotated a half turn so that the pin 18 engages the slot 22' rather than the slot 22 as shown in FIG. 5. The color wheel is equipped with another set of colored bands 28', 30' and 32 which are brought to a new mean position by a half turn rotation so that they may move between the incandescent lamp 14 and the case opening 34. The bands 28' and 30' match the color and sequence of bands 28 and 30 but are wider so that a larger displacement of the signal arm relative to the set point arm is required to produce a color change. If desired, a cam wheel could be equipped with several slots and the color wheel with several corresponding color sets. Other alternative mechanisms such as a means for adjusting the position of the slot or the actuating pin and/or the filter could be used to provide an even greater choice of kind of color modulation.

The deviation indicator and its use has been described in an embodiment having to do with process control instrumentation. Clearly a deviation indicator of this type would be applicable to other types of instrumentation. For example, an automobile speedometer equipped with a set point means and a deviation indicator would be a most useful driver aid in maintaining a desired speed. Also, in the embodiment the mechanisms actuating the set point and signal indicating arms are required; in general, however, since the deviation indication is obtained simply by rotating the cam wheel through an angle to move the filters, a deviation indicator in accordance with this invention may be used in most instruments in which a signal indicating means may be adapted to provide the necessary motion to move the filters.

We believe this to be a unique and simple way of obtaining a color modulated deviation display. As previously noted such a display is easy to read and attention getting as well, both features of which are desirable in an instrument that is to be monitored.

We claim:

1. In an instrument apparatus to indicate by light the deviation of a process from a desired set point, including in combination, a set point arm, a signal arm adapted to be moved relative to said set point arm, a source of light, light filter means including at least one graded filter, a rod having a first end and a second end and adapted for the transmission of light by internal reflection, said rod being optically coupled to said graded filter and said light source in a manner to allow light from said light source to shine through said graded filter and onto said first end of said rod to be transmitted to said second end of said rod thereby illuminating said second end of said rod, means forming an axis about which said light filter means is adapted to pivot to move said graded filter relative to said rod, mechanical linkage means acting in cooperation with said set point arm, said signal arm and said light filter means to cause said light filter means to pivot about said axis to move said graded filter relative to said rod according to the displacement of said signal arm relative to said set point arm thereby providing modulated light at said second end of said rod for indicating the deviation.

2. The apparatus of claim 1 in which said graded filter is graded with discrete steps of different colors.

3. The apparatus of claim 1 in which said graded filter is graded continuously in color.

4. In a deviation indicator which provides a visual display of modulated light as an indication of the relative displacement of a lever arm with respect to a reference point, said reference point being adjustable whereby the same can be established at a predetermined desired position, the combination of means forming an axis, a cam wheel rotatable about said axis and having a multiplicity of slots therein, an actuating pin attached to said lever arm, said actuating pin adapted to be engaged in any one of said slots to cause said cam wheel to rotate through an angle as said lever arm is displaced relative to said reference point, a color wheel attached to said cam wheel having sets of filters for modulating light corresponding to said slots in said cam wheel so that a particular one of said filter sets may be used for light modulation by engaging said actuating pin with a corresponding one of said slots in said cam wheel thereby permitting a choice of the kind of light modulation provided by said deviation indicator.

5. The apparatus of claim 4 in which said filter means includes at least two graded filters, and means for selectively optically coupling one of said graded filters to said light source and said illuminated means.

References Cited by the Examiner

UNITED STATES PATENTS

| | | | |
|---|---|---|---|
| 1,070,392 | 8/1913 | Benecke | 73—411 |
| 2,309,941 | 2/1943 | Drummond | 116—129 |
| 2,378,526 | 6/1945 | Agnew. | |
| 2,806,402 | 9/1957 | Ferris | 250—226 X |
| 3,074,372 | 1/1963 | Furey | 116—57 |

RICHARD C. QUEISSER, *Primary Examiner.*

DAVID SCHONBERG, *Examiner.*